US011589203B2

(12) United States Patent
Kusens et al.

(10) Patent No.: US 11,589,203 B2
(45) Date of Patent: Feb. 21, 2023

(54) METHOD AND SYSTEM FOR REQUESTING AND SHARING INFORMATION BETWEEN MOBILE DEVICES AND PHONE SYSTEMS

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLC, Wilmington, DE (US)

(*) Notice: Subject to any disclaimer, the term of this patent is extended or adjusted under 35 U.S.C. 154(b) by 0 days.

(21) Appl. No.: 15/631,280

(22) Filed: Jun. 23, 2017

(65) Prior Publication Data

US 2018/0376300 A1  Dec. 27, 2018

(51) Int. Cl.
*H04W 4/00* (2018.01)
*H04W 4/90* (2018.01)
*H04W 4/02* (2018.01)
*H04W 4/16* (2009.01)
*H04W 12/06* (2021.01)
*H04L 9/40* (2022.01)
*H04W 4/60* (2018.01)

(52) U.S. Cl.
CPC ............ *H04W 4/90* (2018.02); *H04L 63/107* (2013.01); *H04W 4/02* (2013.01); *H04W 4/16* (2013.01); *H04W 12/06* (2013.01); *H04W 4/60* (2018.02)

(58) Field of Classification Search
CPC ........ H04L 67/42; H04W 84/12; H04W 4/90; H04W 76/50; H04W 4/029; H04W 4/02
See application file for complete search history.

(56) References Cited

U.S. PATENT DOCUMENTS

| | | | |
|---|---|---|---|
| 2005/0053220 A1* | 3/2005 | Helbling | H04M 3/387 379/211.02 |
| 2006/0027648 A1* | 2/2006 | Cheah | G06Q 10/06 235/381 |
| 2012/0225632 A1* | 9/2012 | Hellwig | H04W 4/90 455/404.1 |
| 2014/0244744 A1* | 8/2014 | Lyren | G06Q 50/01 709/204 |
| 2017/0310827 A1* | 10/2017 | Mehta | H04W 4/90 |

* cited by examiner

*Primary Examiner* — Omoniyi Obayanju
(74) *Attorney, Agent, or Firm* — Daniel S. Polley, P.A.

(57) ABSTRACT

A method and system to allow the exchange of information between a person's mobile device and a business, institution, organization, agency, etc. to send, as per request, information that is required or is relevant to the parties, without having to interrupt the call. The businesses, institutions, organizations, agencies, etc. can be for instance, a 911 dispatcher office, a merchant that operates through the phone or a service provider, though such examples are not considered limiting.

33 Claims, 10 Drawing Sheets

METHOD AND SYSTEM FOR REQUESTING AND SHARING INFORMATION BETWEEN MOBILE DEVICES AND PHONE SYSTEMS

FIELD OF THE DISCLOSURE

The disclosure is related generally to location determinations from mobile device information and more specifically to location determinations during an emergency event based on information received from a mobile device at the event.

BACKGROUND

Cell phones, smartphones and other mobile devices have become the primary method of personal communication for most people. While the benefits of mobile communication devices are well known, there are still some challenges that exist when individuals are communicating on mobile devices. For example, with landline communications, exact location and address information could be associated with a particular line, thus enabling this information to be provided to emergency services dispatchers in the event of an emergency. Mobile devices don't have a dedicated location assigned to them and therefore must rely on methods such as cellular triangulation, GPS or other location services built into existing devices for location determination. This necessitates that this location information be provided in real-time from the mobile device to the emergency services dispatcher. However, this location information is incomplete or inaccurate in most instances. These methods cannot determine floor or apartment number for example. The below disclosed novel system and method is directed to addressing the problem.

SUMMARY OF THE DISCLOSURE

Generally disclosed is a novel system and method that address the above-described problem of a mobile device transmitting or providing incomplete or inaccurate location information by allowing the mobile device owner to store additional specific location and/or other information and provides for the exchange of this additional information with an emergency services dispatcher, in one non-limiting example. The system and method can be directed towards allowing for the exchange of information between the user's mobile device and a business or institution including but not limited to, information such as credit card information, account numbers and/or addresses.

The method and system allow for the exchange of information between a person's mobile device and a business or an institution, to send, as per request, information that is required or is relevant to the parties, without having to interrupt the call between the mobile device and the business/institution. This businesses or institutions can be for instance, though not limiting, a 911 dispatcher office, a merchant that operates through the phone or a service provider, though such is not consider limiting and other businesses, companies, institutions, agencies, and/or organization (collectively "Organization"), can also be the party on the call with the user's mobile device The disclosed method can be preferably performed through specifically designed and configured applications running on mobile electronic systems or devices, allowing for the exchange of relevant information described above and below.

The following non-limiting definitions are provided as an aid in understanding at least a preferred embodiment for the disclosed novel method and system:

| Term | Definition |
|---|---|
| Information Exchange System Application ("App") | A specially designed software application "App" that is installed on the person's electronic system or device (preferably portable or mobile electronic device) and which allows for the exchange of information between the requestor and person's electronic systems or devices. |
| Information Exchange System Application Database ("App Database") | An electronic database where contacts, settings, preferences, current location and/or information related to the "App" are stored on the person's electronic systems or devices. |
| Information Exchange Sync System Application ("Sync App") | A specially designed software application "Sync App" that is installed on an electronic system or device (preferably a cloud-based server) and which allows for the person's contacts, settings, preferences, current location and/or information related to the "App" to be copied for restoration on future devices, synchronization to other devices of the person and exchanging information with requestors. |
| Information Exchange Sync System Application Database ("Sync App Database") | An electronic database, preferably on a cloud-based server, where contacts, settings, preferences, current location and/or information related to the "App" for a given person are stored. |
| Information Exchange System Request Application ("Request App") | A specially designed software application "App" that is installed on the requestor's electronic system or device (preferably portable or mobile electronic device) and which allows for the exchange of information between the requestor and person's electronic systems or devices. |
| Person's (Customer's) Electronic System or Device | A computer system or device (preferable mobile and portable) including but not limited to a cell phone, smartphone, tablet, smart watch, laptop, card or other computer system belonging to a person (customer) that is specially programmed with the Information Exchange System App "App" to permit communication by the persons computer system or device with a Requestors computer/electronic system or device. |
| Requestor's Electronic System or Device | A computer system or device (preferable mobile and portable) including but not limited to a cell phone, smartphone, tablet, smart watch, laptop, card or other computer system belonging to a requestor that is specially programmed with the Information Exchange System Request Application "Request App" to permit communication with the Requestors Phone System and the Person's electronic system or device with the App running. |
| Agent/Requestor Phone and/or Computer System | A telephone and/or computer system used for voice communications, responder routing, data processing, and any other purpose to facilitate the handling of the customer's needs. It belongs to the business, institution. Organization or other user of the Information Exchange System and can be a single system or multiple system that are used in combination to provide the necessary functionality. |
| DTMF | (Dual Tone Multi Frequency) is a tone-based signal transmitted over phone lines, wired and wireless. The sound heard when pressing keys on a phone is an example of a DTMF signal. |
| Information Exchange ID | A unique ID issued to a person's electronic system or device running the App. The ID can be an alphanumeric ID, the devices phone number, or any other unique identifier that is static for the device or dynamic for a given session. |
| Data Element | A piece of shareable information that can be either defined by the user or gathered from the environment. Non-limiting examples include GPS location, WiFi Location, Bluetooth/BLE Location, Temperature, Altitude, Barometric Pressure, Address, Account Number, Credit Card Info, IMEI and IP address. |
| Administrator | One or more persons responsible for entering and maintaining information about each person to be tracked in the system and/or system database as | well as configuring locations and other system settings.

DESCRIPTION OF THE DRAWINGS

Figure 1:
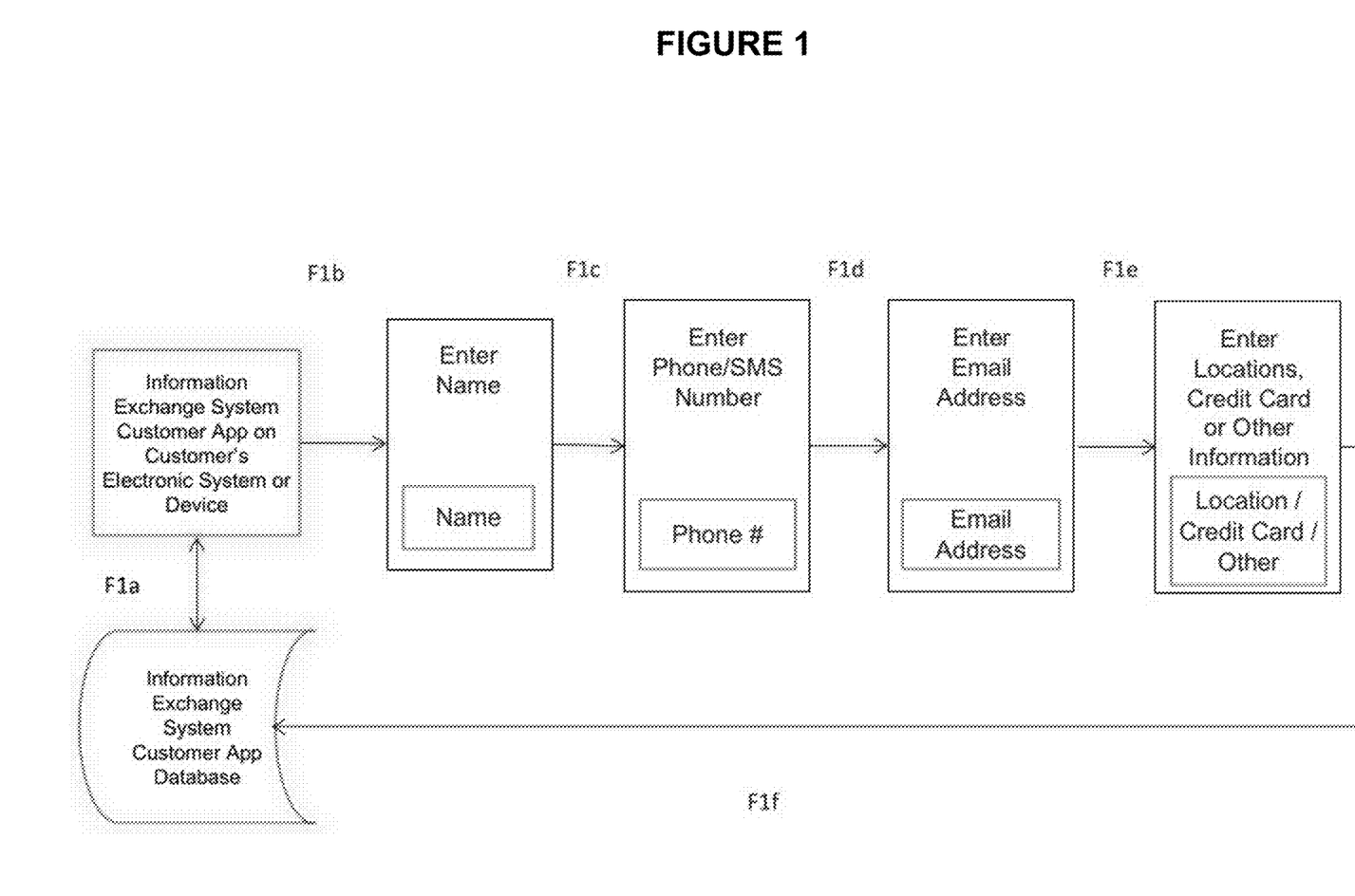
FIG. 1 is a process flow and block diagram illustrating the initial setup and configuration of the information exchange system app on a person's (customer's) device in accordance with one non-limiting embodiment for the disclosed system and method.

FIG. 1 shows one non-limiting method for allowing a person to setup the information exchange system app of their electronic system or device. Without limitation, this initial process allows a customer "person" to store information in the app for exchanging with requestors using the information exchange system app.

At F1a, a person downloads and installs the Information Exchange System Application "App" from their computer/electronic device or any app store or marketplace including, but not limited to, the Apple App Store, Windows Store and Google Play marketplace. The App is downloaded to the person's electronic system or device along with a database for storing information associated with the App. The App can also be preloaded on the Person's electronic device at the time the person purchases or otherwise receives the electronic device.

At F1b, when the App is first opened, it preferably prompts the user/person to enter in a series of information about the user/person. This information may be exchanged with a requestor at a later point in time. Though not limiting, first, it can ask for a name of the person.

At F1c, the person can preferably enter in their cellular phone and/or SMS phone numbers.

At F1d, the person can preferably enter in their email address though doing so is not required or considered limiting.

At F1e, the person can preferably enter in additional information that can be accessed and exchanged through the information exchange system app. Information entered at this step can include, but is not limited to, Addresses/Locations, Credit Cards, Account Numbers, Passwords/Security Keys and/or License Numbers and can include other information depending on the specific intended use for the App.

At F1f, the information exchange system app electronically stores the person's form submissions within the information exchange system app database running on the person's electronic system or device. The storing can be initiated automatically by the App or by the person initiating a save command.

Figure 2:
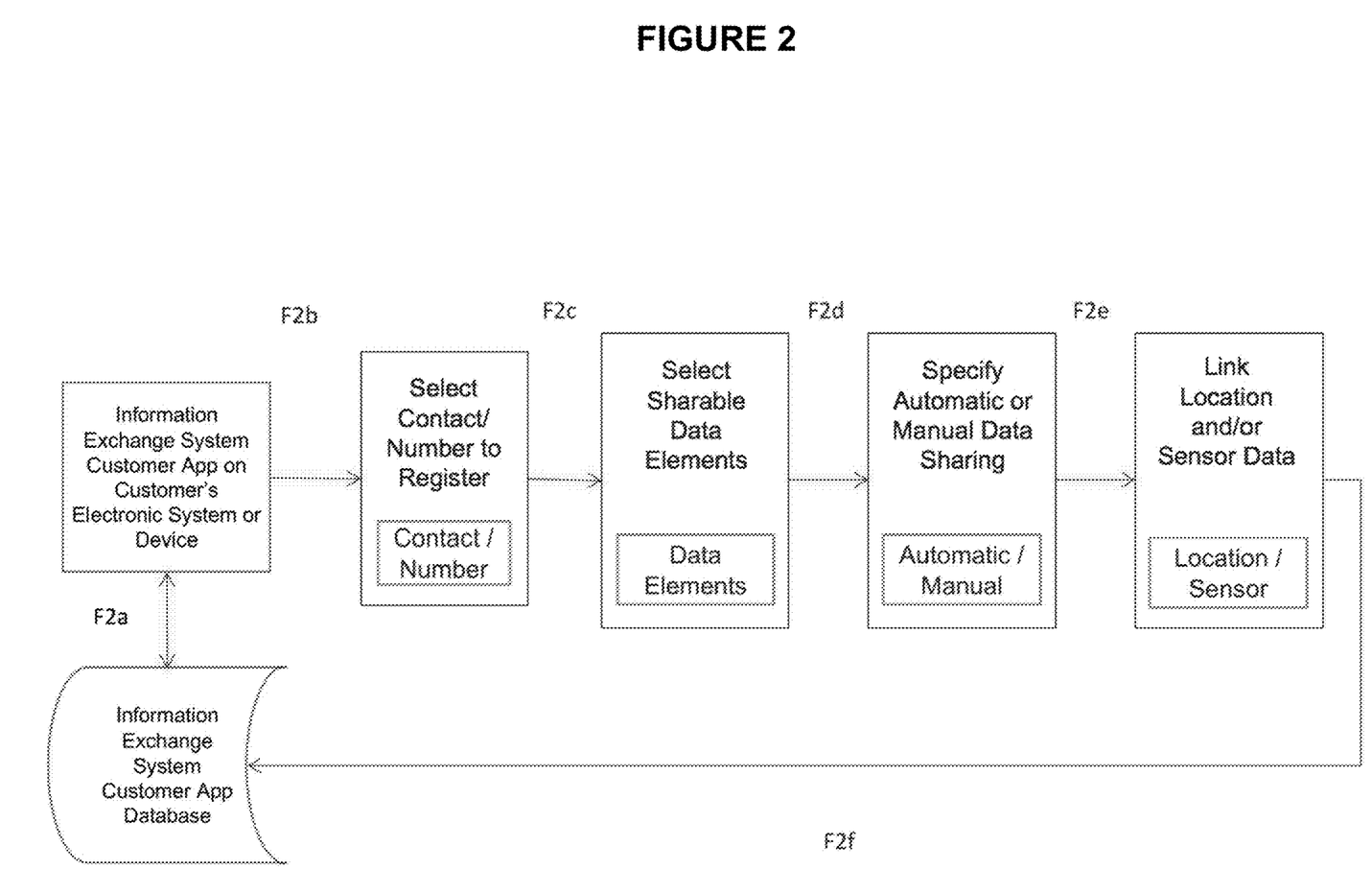
FIG. 2 is a process flow and block diagram illustrating the registration and configuration of known contacts within the information exchange system app in accordance with one non-limiting embodiment for the disclosed system and method.

FIG. 2 shows one non-limiting method for allowing a customer "person" to setup known contacts, numbers and preferences on the information exchange system app installed on their electronic system or device. Without limitation, this initial process allows a person to store preferences and configuration information in the App for exchanging with requestors using the information exchange system app.

At F2a, a person opens the Information Exchange System Application "App" on the person's electronic system or device. The App can request current information, settings and preferences stored in the database associated with the App.

At F2b, the person is allowed to select a contact already or previously stored in the App, electronic system or device's address book or can enter a new contact and number to register with the App.

At F2c, the person can preferably select the data elements entered in FIG. 1 to allow this contact to request and thus be exchanged through the App.

At F2d, the person can preferably select whether the data elements selected in F2c can be automatically sent via the App to this specific requestor upon receipt of a valid request or whether the person can be prompted to accept the information exchange request before sharing the data elements through the App. The person can specify this setting on individual data elements or it can be applied to all data elements configured for exchange with this contact.

At F2e, the person can preferably link their device's location and/or sensor data to individual data elements. As a non-limiting example, a radius can be specified around a given set of GPS coordinates which can cause the person's home address and apartment number to be transmitted by the App when it detects that the person's/user's device is within that boundary at the time a call is placed.

At F2f, the information exchange system app electronically stores the permissions and configured options for this contact within the information exchange system app database running on the person's electronic system or device. The storing can be initiated automatically by the App or by the person initiating a save command.

Figure 3:
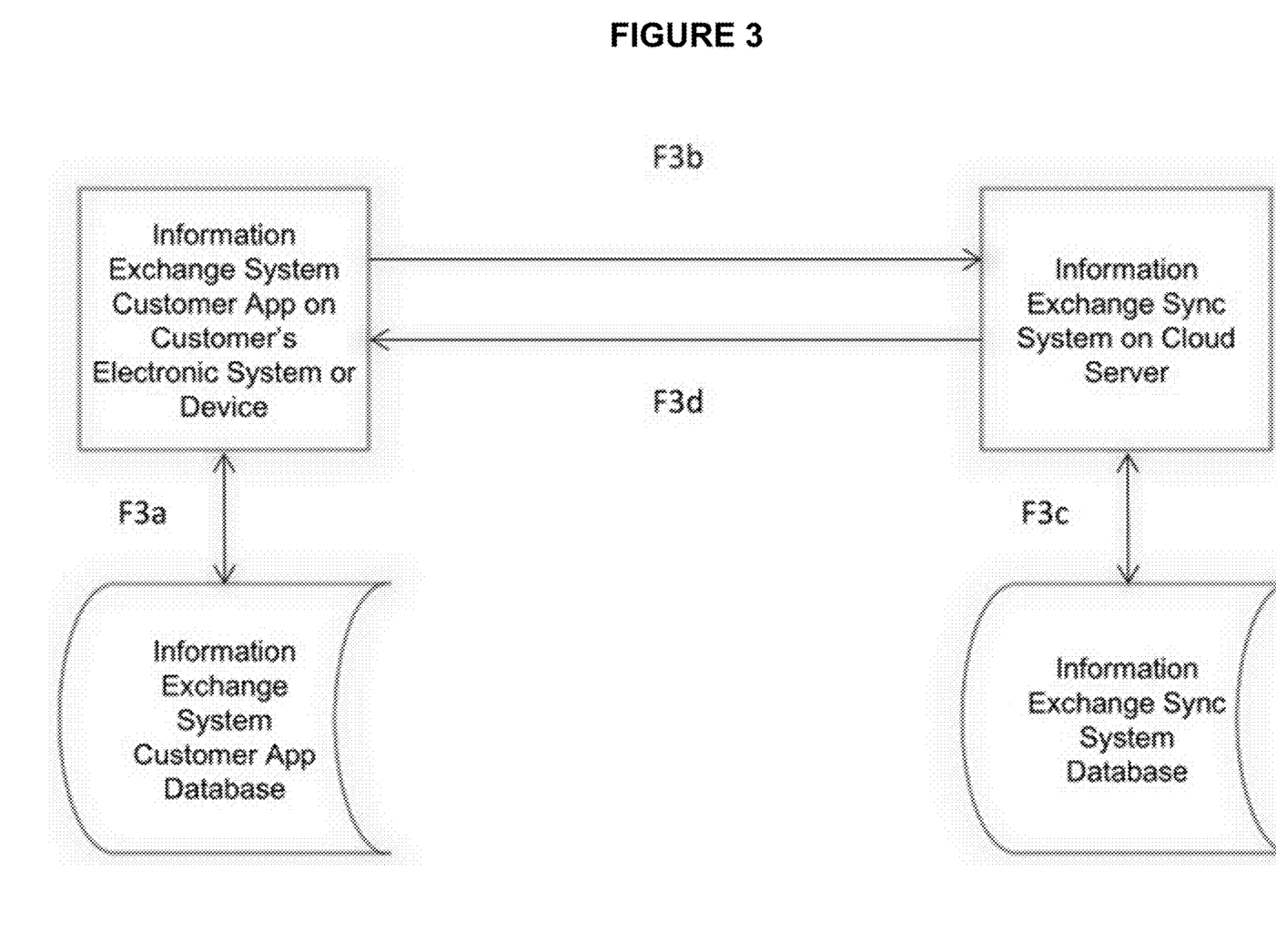
FIG. 3 is a process flow and block diagram illustrating one non-limiting method for storing and synchronizing registered contacts and preferences in a cloud-based information exchange sync system database.

FIG. 3 shows a method for storing and synchronizing registered contacts, information and preferences in a cloud-based information exchange sync system database. Without limitation, this process allows a customer "person" to store preferences and configuration information in the App and have a copy made on the cloud system for synchronizing to other or future devices as well as potential access by the information exchange request application "Request App" for exchanging with authorized requestors.

At F3a, the information exchange system application "App" on the person's electronic system or device retrieves registered contacts, preferences and information configured by the person and stored in the information exchange system customer app database and formats them for transmission to the cloud-server hosting the information exchange sync system application "Sync App".

At F3b, the App on the person's electronic system or device connects to the Sync App on the cloud-server. Without limitation, this connection can be initiated by the person; automatically upon storing a new contact, information or preference; automatically upon updating a stored contact, information or preference; or automatically on a schedule such as, but not limited to, every hour or other time interval.

At F3c, the Sync App stores the received information in the information exchange sync system database.

At F3d, the Sync App can send a notification to the App on the person's electronic system or device indicating successful syncing and storage of the person's contacts, information and/or preferences.

Figure 4:
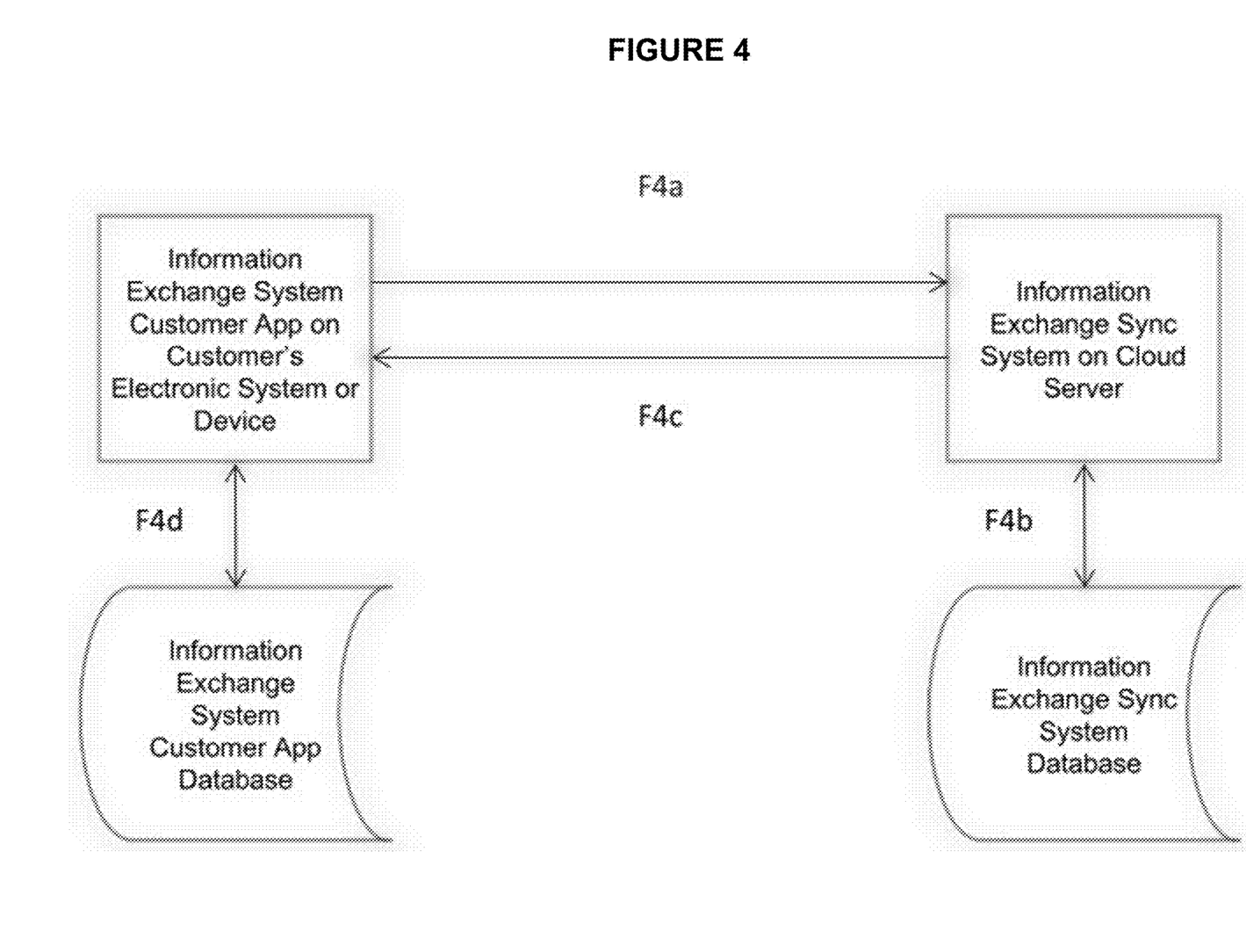
FIG. 4 is a process flow and block diagram illustrating one non-limiting method for retrieving stored and synchronized registered contacts and preferences in a cloud-based information exchange sync system database.

FIG. 4 shows a method for retrieving registered contacts, information and preferences from the cloud-based information exchange sync system database. Without limitation, this process allows a customer "person" to retrieve previously stored preferences and configuration information from the cloud system for new information exchange system customer application "App" installs on an electronic system or device.

At F4a, the App on the person's electronic system or device connects to the information exchange sync system application "Sync App" on the cloud-server and requests to sync contacts, information and preferences for the person's account.

At F4b, the Sync App stores the received information in the information exchange sync system database for that person.

At F4c, the Sync App sends the retrieved contacts, information and preferences to the App on the person's electronic system or device.

At F4d, the App on the person's electronic system or device receives the registered contacts, preferences and information from the Sync App and stored them in the information exchange system customer application database "App Database".

Figure 5:
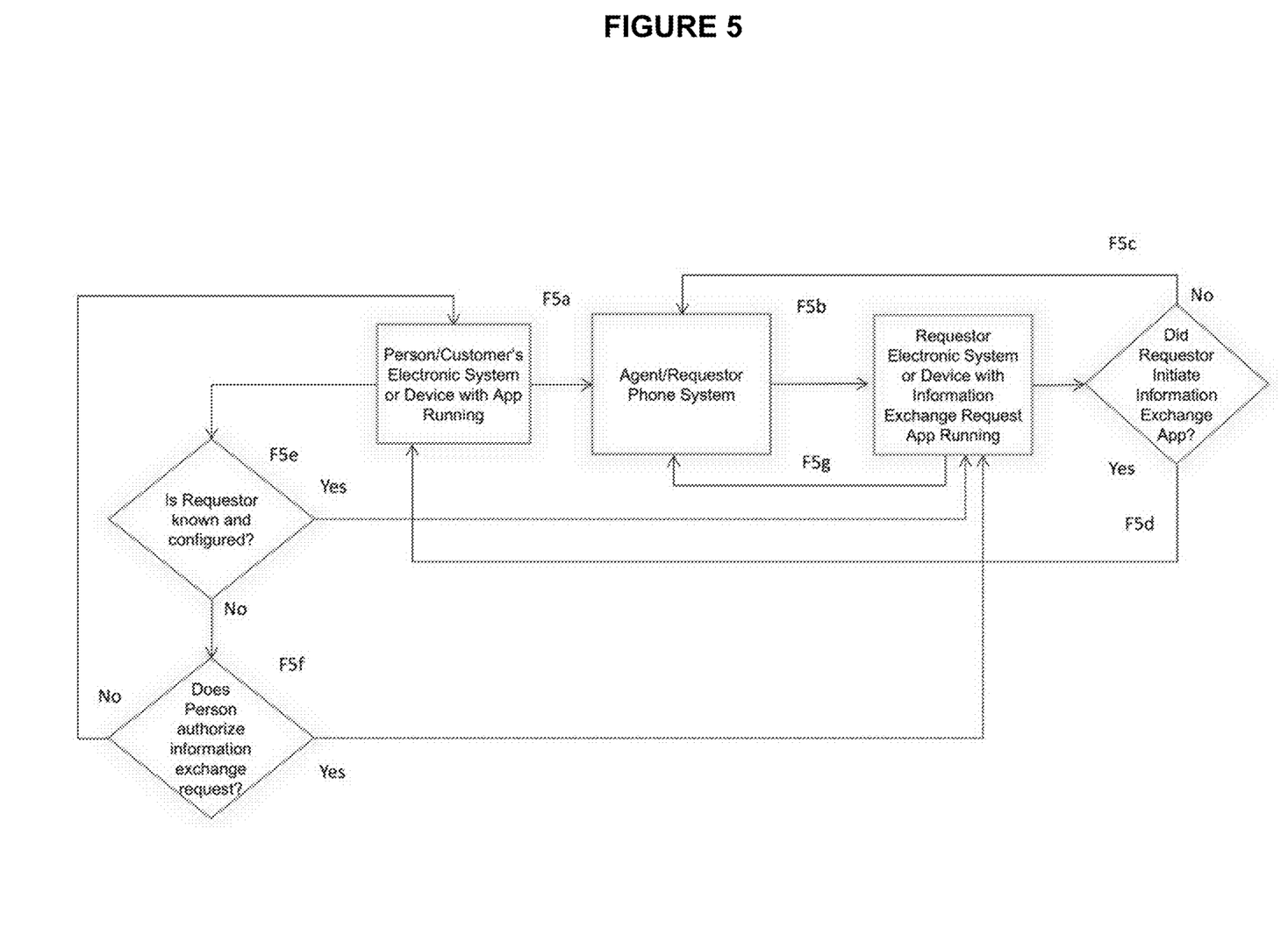
FIG. 5 is a process flow and block diagram illustrating a first non-limiting embodiment for requesting and exchanging information between a person's device and the requestor's device or system by the disclosed system and method.

FIG. 5 shows one method for exchanging information between the Information Exchange System Application "App" running on the customer's "person's" electronic system or device and the Information Exchange Request Application "Request App" running on the requestors electronic system or device.

At F5a, a person with the Information Exchange System Application "App" running on the person's electronic system or device, makes a call to the Requestors Phone System. Though not illustrated, this process could work in reverse with the Requestor placing the outbound call and the Person receiving the call.

At F5b, an agent or dispatcher of the Requestor answers the phone and the Requestor's Phone System sends the caller ID information for the call received to the Request App running on the requestors electronic system or device. Preferably, the Caller ID is used to facilitate the communication between the Requestor's App and the Person's phone/electronic device. In one non-limiting method, the Requestor's app sends a text message to the user's phone which reads that message and responds with the requested information. The Caller ID information is particularly useful in a call center model where the user/Person calls a generic number, such as, without limitation, "911" and can then be connected to any one of dozens of people at any given time.

The caller ID information can be sent via any wired or wireless data transfer method or protocol including but not limited to Serial, IP, IR, WiFi, NFC, Bluetooth, BLE, OCR, Bar Codes and QR Codes.

At F5c, the Request App prompts the Requestor to initiate the information exchange request with the person. This step is optional and it is within the scope of this disclosure for the information exchange request to be automatically initiated upon receipt of the person's caller ID information from the Requestor phone system, thus causing the process to skip this step and process directly to F5d.

At F5d, the Request App checks its own database for the preferred information exchange request method for this particular person and sends an information exchange request to the App on the person's electronic system or device. It is also within the disclosure to lock or restrict the Request App for a given use case to just a single method which it would default to if no preferred information exchange method is stored or known for the person. A default information exchange method could also be set or programmed in the event another exchange method isn't selected or specified. Also, in some non-limiting instances where both the Person's app and Requestor's app communicate with a Sync App, the method can be set by the Person and then retrieved by the Requestor. The phone number typically provides useful information to use to look up the preferences for a person on a Sync App database.

The Request App database can be a local database that syncs with the information exchange sync system database on the cloud using a process similar to the ones described in FIGS. 3 and 4 above or it can be a direct query to the information exchange sync system application database on the cloud-based server though neither method is considered limiting. The information exchange request can be sent via methods including but not limited to SMS, Email, Morse Code and DTMF tones. The Requestor Electronic System or Device with Information Exchange Request App Running can be an iPad/Android Tablet. In a non-limiting use example, a 911 Dispatch system (phone and computer) receives the call from the person, passes the caller id information to the Requestor App running on the iPad and then the iPad communicates with the person's phone to get the information. When the iPad receives the information back, the system/method can interface back to the phone/computer system of the dispatcher with the information received by the iPad from the person.

At F5e, the App running on the person's electronic system or device makes a determination as to whether the information exchange request received was from a known and configured contact. In a non-limiting example, the App can have default settings (e.g. preconfigured contacts for 911, etc.) or can prompt the user to create an exchange setting upon installing and/or first using the App. If the App determines that the information exchange request was from a known contact, it will follow the configured options for sending information to the known contact and the process skips to F5g below. If the App determines that the information exchange request is not from a known contact or if the known contact is configured to require authorization, the person is presented with an option to authorize the information exchange request or not and the process moves on to F5f.

At F5f, the person is prompted to authorize or deny the information exchange request. If the person denies the request to exchange information, a notation can be made in the App's database and the process can begin again at F5a for the next call. If the person authorizes the information exchange request, the requested information is sent to the Request App on the Requestors electronic system or device.

At F5g, the Request App sends the received information to the Requestors Phone or Computer system. This can be accomplished via computer data connections, bar codes, QR codes, or other interface and data transfer method.

Figure 6:
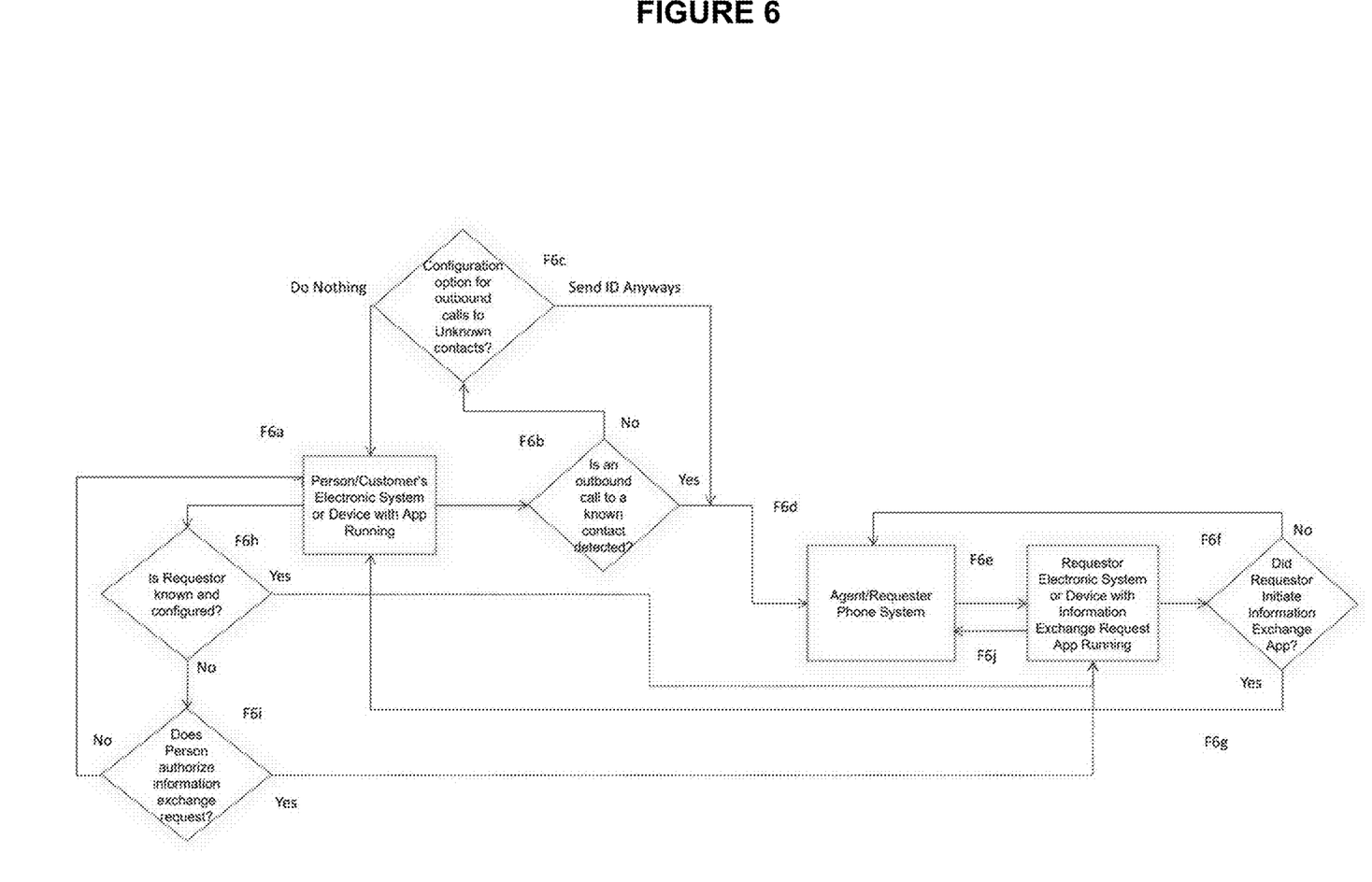
FIG. 6 is a process flow and block diagram illustrating a second non-limiting embodiment for requesting and exchanging information between a person's device and the requestor's device or system by the disclosed system and method.

FIG. 6 shows another method for exchanging information between the Information Exchange System Application "App" running on the customer's "person's" electronic system or device and the Information Exchange Request Application "Request App" running on the requestors electronic system or device in situations where caller ID information is not available to the Request App.

At F6a, a person with the Information Exchange System Application "App" running on the person's electronic system or device, makes a call to the Requestors Phone System.

At F6b, the App determines if the outbound call was made to a known and registered contact. If the call is being made to a known and registered contact, the process skips to F6d below. As the App is running on the person's mobile/electronic device, the App monitors the outbound calls (i.e. numbers dialed or contacts selected from the device/phone's internal address book). If the outbound call is made to an unknown contact, the process moves to F6c.

At F6c, the App determines the configured option for outbound calls to unknown contacts. If the App is configured to do nothing with calls to an unknown contact, the process terminates and begins over again at F6a with the next outbound call. If the App is configured to send an information exchange ID for unknown contacts then it does so and the process continues at F6d below. The App on the person's phone preferably sends the information to the Request App on the dispatcher's system, in one non-limiting embodiment. The information can be sent using DTMF, Morse code, Ultrasonic or other audio signaling and data transmission technology. In one non-limiting embodiment, the Request app on the dispatcher's side can listen in real-time on the audio stream of the call and detect the ID being broadcast over the phone line.

At F6d, the outbound phone call is connected to the Requestors Phone System. The App continuously broadcasts the information exchange ID while the call is placed and connected.

At F6e, an agent or dispatcher of the Requestor answers the phone and simultaneously streams the audio of the call to the Requestors Electronic System or Device with the Request App running. This can be done via any wired or wireless audio transfer method or protocol including but not limited to Serial, IP, IR, WiFi, NFC, Bluetooth, BLE, Speakers or Microphones. The app listens for the information exchange ID which can be broadcast over the phone line using DTMF, Morse code, Ultrasonic or other audio signaling and data transmission technology. As previously mentioned, in one non-limiting embodiment, the Requestor Electronic System or Device with the Information Exchange Request App running thereon can be an iPad or other tablet based device running the Request App. With this particular step (F6e), the person's mobile/electronic device can provide an ID to the Request App at the dispatcher's location (in one non-limiting embodiment, as other locations can also be used for the disclosed system and method). This ID can be separate from the earlier mentioned Caller ID, which can be used as a way to identify the person's phone and provide for an information exchange method. Where the caller ID is not available, the Information Exchange ID referred to in F6e provides alternative methods of communicating a unique ID of the person's phone with App to the Request App and thus initiating an information exchange. The Information Exchange ID could be the devices phone number, though such is not considered limiting and the ID could be something else as well. The below discussed steps F6f and F6g are what happens on the dispatcher side after receiving the ID of the person who called into 911, as one non-limiting example.

At F6f, the Request App prompts the Requestor to initiate the information exchange request with the person. This step is optional and it is within the scope of this disclosure for the information exchange request to be automatically initiated upon receipt of the person's information exchange ID from the Requestor phone system, thus causing the process to skip this step and process directly to F6g.

At F6g, the Request App checks its own database for the preferred information exchange request method for this particular person and sends an information exchange request to the App on the person's electronic system or device. The Request App database can be a local database that syncs with the information exchange sync system database on the cloud using a process similar to the ones described in FIGS. 3 and 4 above or it can be a direct query to the information exchange sync system application database on the cloud-based server though neither method is considered limiting. A default method can also be selected for all information exchange requests or just for those with unknown contacts. The information exchange request can be sent via methods including but not limited to SMS, Email, Internet Protocols and Formats (TCPIP, XML, JSON, etc.), Morse Code and DTMF tones.

At F6h, the App running on the person's electronic system or device receives the information exchange request and makes a determination as to whether the information exchange request received was from a known and configured contact. If the App determines that the information exchange request was from a known contact, it will follow the configured options for sending information to the known contact and the process skips to F6j below. If the App determines that the information exchange request is not from a known contact or if the known contact is configured to require authorization, the person is presented with an option to authorize the information exchange request or not and the process moves on to F6i. The information sent in all embodiments can include the specific current location of the person, which can be as detailed as a particular room in a particular apartment or office of a multi-unit building.

At F6i, the person is prompted to authorize the information exchange request. If the person denies the request to exchange information and a notation is made in the App's database and the process begins again at F6a for the next call. If the person authorizes the information exchange request, the requested information is sent to the Request App on the Requestors electronic system or device.

At F6*j*, the Request App sends the received information to the Requestors Phone or Computer system. This can be accomplished via computer data connections, bar codes, QR codes, or other interface and data transfer method.

Figure 7:
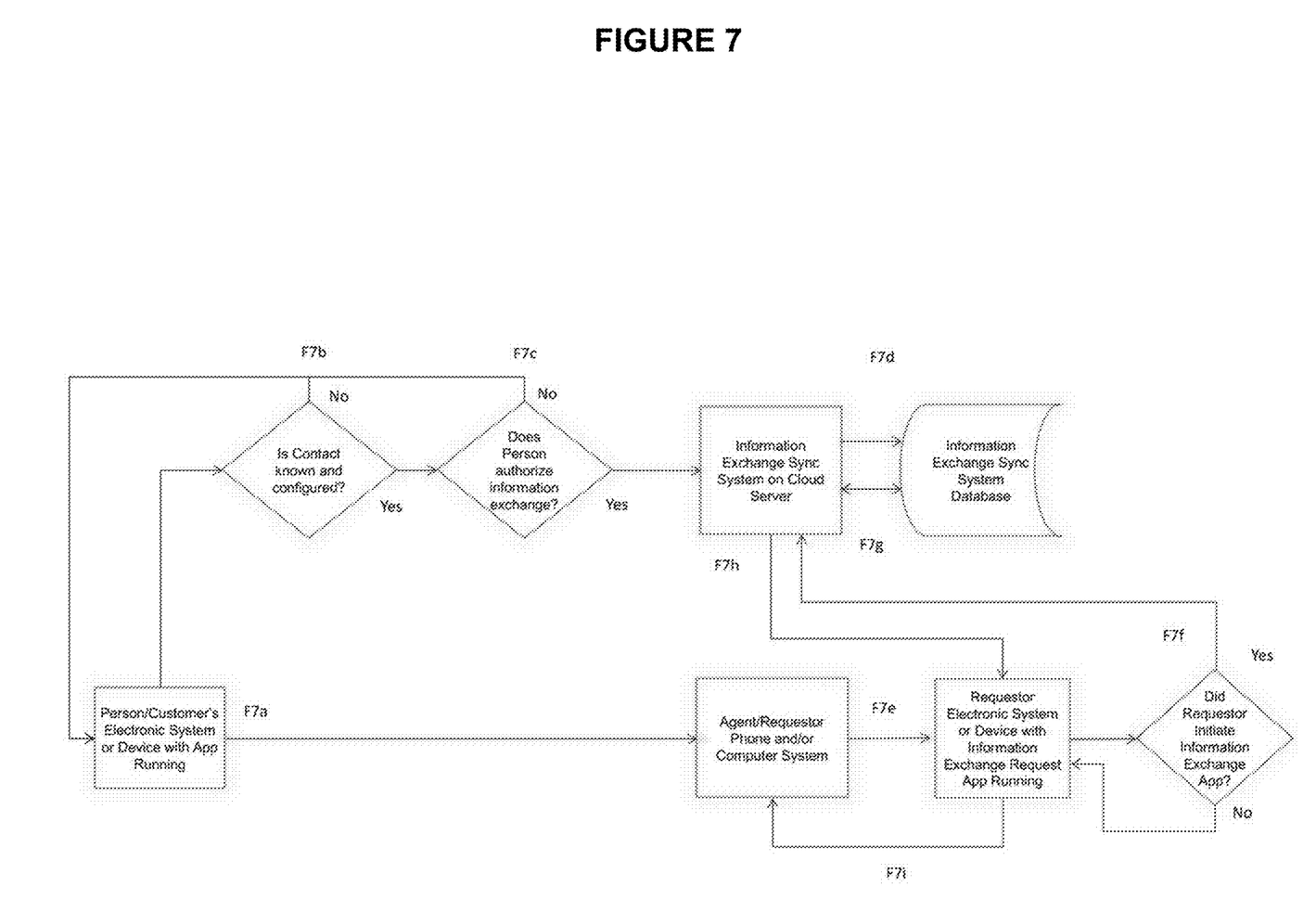
FIG. 7 is a process flow and block diagram illustrating another non-limiting embodiment for requesting and exchanging information between a person's device and the requestor's device or system by the disclosed system and method.

FIG. 7 shows another method for exchanging information between the Information Exchange System Application "App" running on the customer's "person's" electronic system or device and the Information Exchange Request Application "Request App" running on the requestor's electronic system or device through the use of an Information Exchange Sync System "Sync System".

At F7*a*, a person with the Information Exchange System Application "App" running on the person's electronic system or device, makes a call to the Requestors Phone System.

At F7*b*, the App is constantly monitoring for outbound calls and when it detects the call was placed in F7*a*, the App determines if the outbound call was made to a known and registered contact. If the call is being made to a known and registered contact, the process proceeds to F7*c* if so configured or may skip to F7*d* if the App is configured to automatically send information to a known and configured contact. If the outbound call is made to an unknown contact, the process can terminate and wait for the App to detect another outbound call.

At F7*c*, if the App is so configured, the person can be prompted to authorize an information exchange with the Sync System. If the person denies the request to exchange information, the process terminates and waits for the App to detect another outbound call. If the person authorizes the information exchange, the requested information is sent to the Sync System based on the configured options for sending information. The Sync System is preferably hosted on a cloud server though the location of the server is not considered limiting.

At F7*d*, the information sent from the App to the Sync system is stored in the Information Exchange Sync System Database along with the phone number of the person's device.

At F7*e*, an agent or dispatcher of the Requestor answers the phone and the Requestor's Phone System sends the caller ID information for the call received to the Request App running on the requestor's electronic system or device. The caller ID information can be sent via any wired or wireless data transfer method or protocol including but not limited to Serial, IP, IR, WiFi, NFC, Bluetooth, BLE, OCR, Bar Codes and QR Codes. Similar to the discussion above for FIG. 6, this embodiment can also work where no caller ID information is provided, as the ID can be sent over the phone line in a number of non-limiting ways, such as, but not limited to, DTMF, Morse code, Ultrasonic or other audio signaling and/or data transmission technology.

At F7*f*, the Request App prompts the Requestor to initiate the information exchange request with the person. If the Requested declines to request the information, the process terminates and a notation is made in the Request App, which can be stored in the Request App database. If the requestor initiates the information exchange, the process proceeds to F7*g*. This step is optional and it is within the scope of this disclosure for the information exchange request to be automatically initiated upon receipt of the person's information exchange ID from the Requestor phone system, thus causing the process to skip this step and proceed directly to F7*g*.

At F7*g*, the Sync System receives the information exchange request and queries for any information exchanged by the person's device based on matching Device ID (Phone number, etc.) values.

At F7*h*, the Sync System transmits the requested information to the Request App on the Requestors system or device.

At F7*i*, the Request App sends the received information to the Requestors Phone or Computer system. This can be accomplished via computer data connections, bar codes, QR codes, or other interface and data transfer method.

Figure 8:
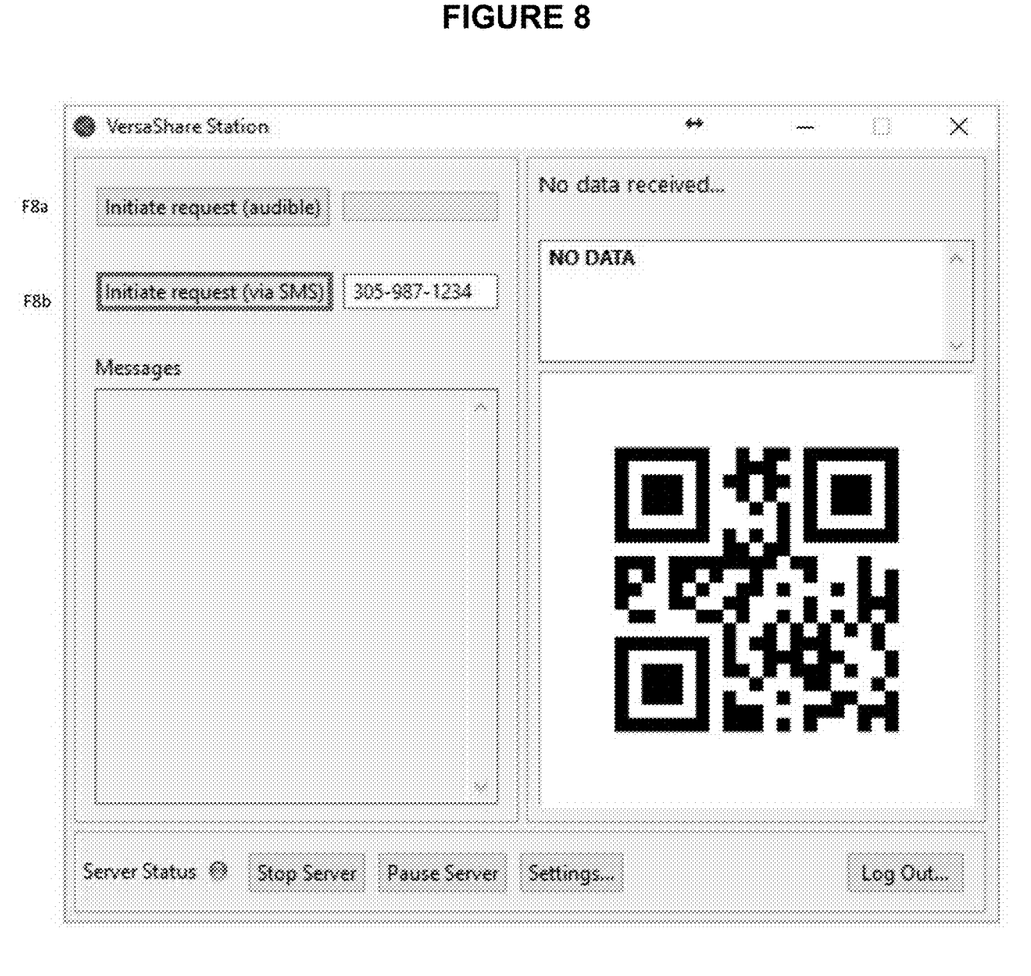
FIG. 8 is a non-limiting example of a request for information exchange being initiated in the information exchange app running on the requestors electronic system or device as described by the disclosed system and method.

FIG. 8 is a non-limiting example of an information exchange request app running on the requestors electronic system or device as described by the disclosed system and method. While several methods for initiating an information exchange request are shown, other options and methods are available as disclosed in FIG. 4 above.

At F8*a*, a button is presented for the requestor to initiate an information exchange request using an audible method including but not limited to DTMF, Morse Code of other audio data signaling method or protocol. Clicking or pressing on the button would cause the information exchange request to be sent.

Figure 9:
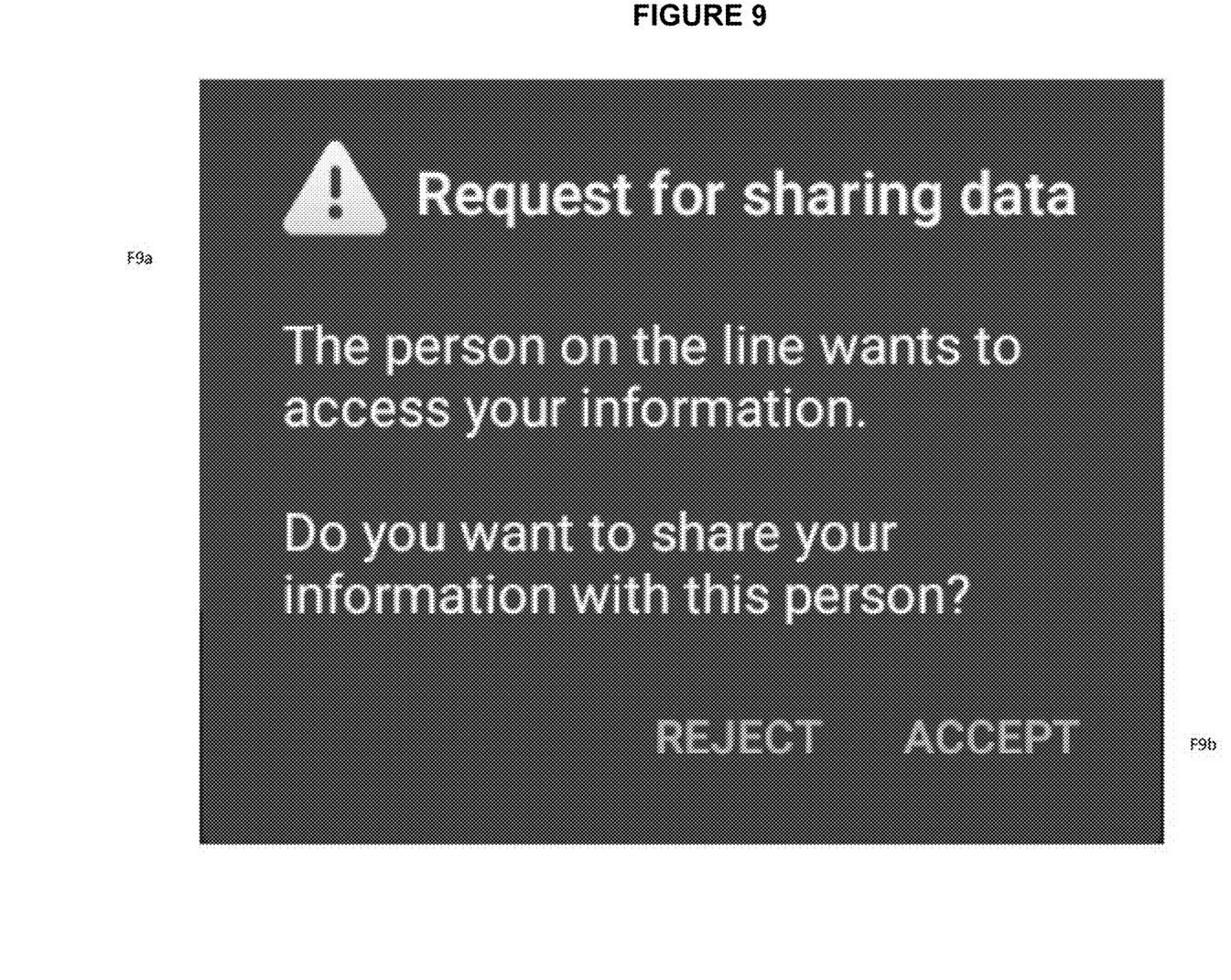
FIG. 9 is a non-limiting example of a request for information exchange as received by the person on the information exchange application "App" running on the person's electronic system or device. The person can be presented with Accept and Reject options as described for certain non-limiting embodiments of the disclosed system and method.
Figure 10:
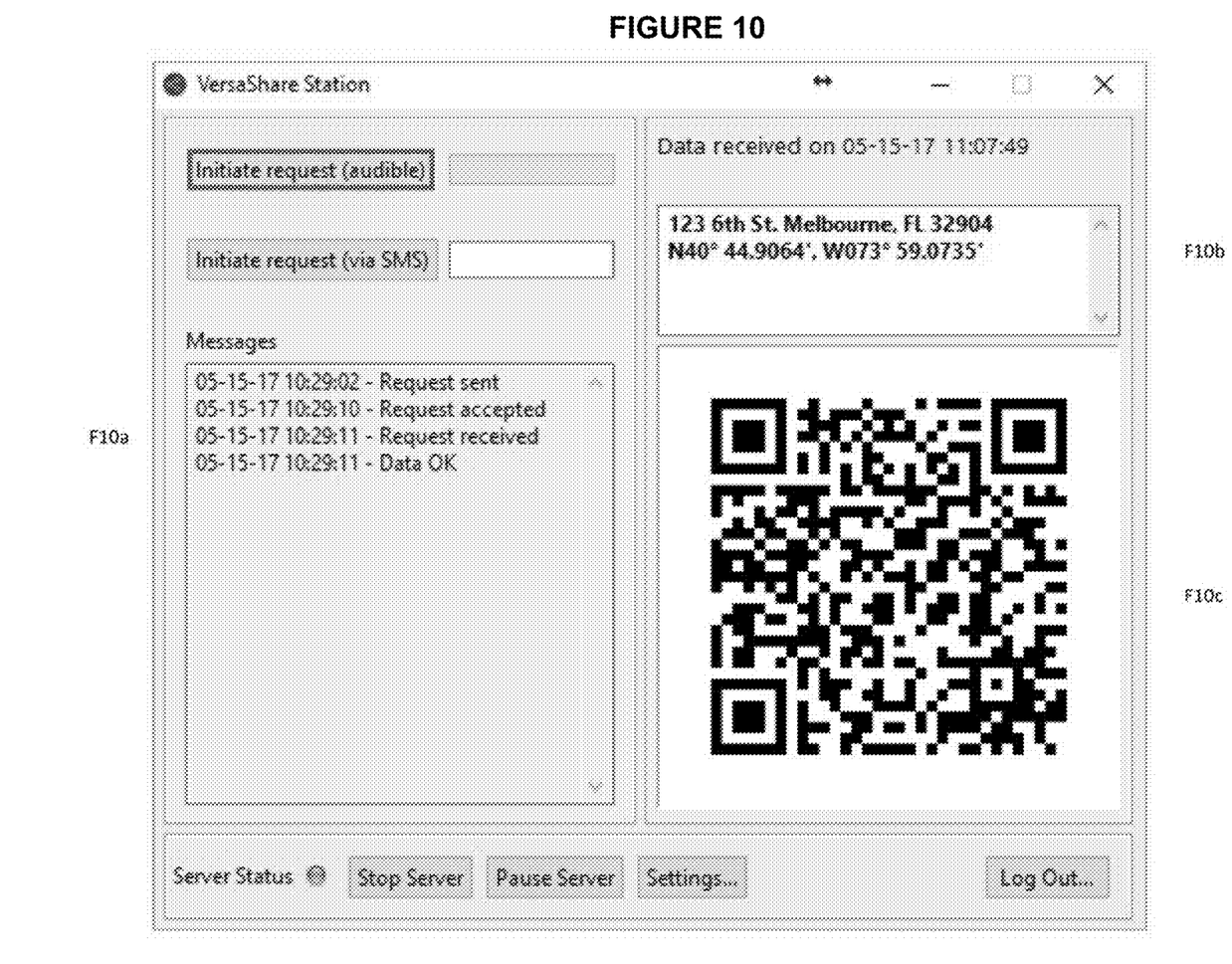
FIG. 10 is a non-limiting example of the receipt of information by the information exchange app running on the requestors electronic system or device as described by the disclosed system and method.

At F8*b*, a button is presented for the requestor to initiate an information exchange request via SMS messaging. The SMS number has previously been provided to the Request App from the Requestors Phone System or Person's electronic system or device running the App. Clicking or pressing on the button would cause the information exchange request to be sent. This figure is an example of the Request App running on the iPad. The button described in F8*a*, initiate request (audible), is the button to send a request via DTMF (or other audible method, such as, without limitation, Morse code, ultrasonic, etc.) from the Request App to the App on the person's mobile device. The button in F8*b* can be the same, but instead uses SMS technology instead of an audio method to send the request for information. FIG. 9 below shows the prompt that a user would get on their phone asking whether they want to ok the information request and transmit information. FIG. 10 shows the response sent by the App on the user's mobile device to the Request app on the iPad of the dispatcher. FIG. 8 is a non-limiting example of the Request App running on the iPad or other tablet. The button described in F8*a* (i.e. initiate request (audible)) can be the button to send a request via DTMF (or other audible method such as, without limitation, Morse code, ultrasonic, etc.) from the Request App to the App on the person's mobile device. The button in F8*b* can be the same, but instead uses SMS technology of an audio method to send the request for information. FIG. 9, discussed further below, shows a non-limiting example of a prompt that a user can get on their phone asking whether they want to "ok"/approve/accept the information request and transmit information. FIG. 10 shows a non-limiting example of a response that can be sent by the App on the user's mobile device to the Request app on the iPad/tablet of the dispatcher.

FIG. 9 is a non-limiting example of a request for information exchange as received by the customer "person" on the Information Exchange System Application "App" running on the person's electronic system or device.

At F9*a*, the Information Exchange System Application "App" running on the person's electronic system or device receives a request for information exchange.

At F9*b*, the person is presented with options to Accept or Reject the information exchange request.

FIG. 10 is a non-limiting example of the receipt of information by the information exchange request application "Request App" running on the requestor's electronic system or device as described by the disclosed system and method.

At F10a, the Information Exchange Request Application "Request App" running on the requestor's electronic system or device receives an information exchange response from the person's electronic system or device running the "App".

At F10b, the requestor is shows the information received from the person's electronic system or device running the "App".

At F10c, the received data is formatted as a QR code for easy entry into the Requestor's Phone System or other system for which the data needs to be input.

The application and system that performs the above described functions and steps can include several components including, but not necessarily limited to, the following: (a) One or more requestor's electronic system or device(s); (b) One or more person's electronic computer system or device(s); (c) One or more requestor's phone system; (d) Information Exchange System Application Database; (e) Information Exchange System Application; (f) Information Exchange System Request Application; (g) Information Exchange System Request Application Database; (h) Information Exchange Sync System; (i) Information Exchange Sync System Database; (j) A public or private telephony; and/or (k) computer network to connect or communicate the person's device with requestor's phone system and/or device and database with each other. The various components can be in electrical and wireless communication with each other.

As one non-limiting example, the ability to electronically exchange information securely and automatically while talking on the phone will provide significant administrative and financial benefits incident to operators of healthcare, education, hospitality or other venues. Without limitation, these include the following benefits: (a) providing emergency services with location information including story, apartment number or room number to assist responders in locating the person requiring help; and (b) providing restaurants, businesses, stores, delivery services and other institutions or venue with address or payment information for purchased goods and services.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for exchanging information between a portable electronic device and a requestor electronic system or device running an information exchange request application ("Request App") during a manually initiated call between the portable electronic device and the requestor electronic system or device, said method comprising the steps of:
   a1. running an Information Exchange System Application ("App") on a portable electronic device being worn or carried by a first person user; wherein the Information Exchange System Application ("APP") allows for exchanging information between the requestor electronic system or device and the portable electronic device;
   a2. providing an Information Exchange System Application Database ("App Database") within the portable electronic device, the App in communication with the App Database;
   a3. storing one or more contact and other information pertaining to the first person user in the App Database;
   a4. manually entering a phone number associated with a second user by the first person user using the portable electronic device for initiating a telephone call between the first person user to the second user;
   b1. establishing a telephone call connection between the portable electronic device and a second user's phone system;
   b2. as part of establishing the telephone connection in step b1, providing a Caller ID information for the portable electronic device of the first person user to the second user's phone system;
   b3. forwarding the Caller ID information by the second user's phone system to the Request App running on the requestor electronic system;
   c. while the telephone call is ongoing between the portable electronic device and the second user's phone system initiating the Information Exchange App running on the portable electronic device by the Request App running on the requestor electronic system using the Caller ID information to permit a request for information exchange to be received by the App running on the portable electronic device of the first person user from the requestor electronic system or device of the second user sent by the Request App; wherein the requestor electronic system or device is a separate and independent system or device from the phone system and are both associated with the second user, wherein the request for information exchange is an independent and separate communication between the first person user and the second user;

d. electronically determining by the App whether the information exchange request received from the Request App was sent by a known and configured contact from the one or more contact information saved in the App Database;

e. determining or obtaining a current location or sensor data for the portable electronic device by the App;

f. determining by the App which information to transmit or send in response to the received request for information exchange based on the determined current location or obtained sensor data;

g. when a known and configured contact is determined by the App in step d. based on information for the second user previously saved in the App Database or the contact is otherwise approved, electronically querying an information exchange system customer application database "App Database" for the requested information by the App, the information exchange system customer application database contained within the portable electronic device and in communication with the App; and h. while the telephone call is ongoing and without interrupting the telephone call electronically transmitting the requested information found by the App from the App Database to the Requestor App by the App.

2. The method for exchanging information of claim 1 wherein configuration information stored in the App Database for a known contact includes a preferred and configured electronic method for automatically sending the requested information by the App to the Request App.

3. The method for exchanging information of claim 1 wherein configuration information stored in the App Database for a known contact includes requiring the App to receive explicit authorization by a user of the portable electronic device before the App electronically transmits the requested information to the Request App.

4. The method for exchanging information of claim 1 wherein when a contact is not known and configured in the App further comprising the step of prompting the user of the portable electronic device to provide explicit authorization to the App before the App is permitted to electronically transmit the requested information to the Request App.

5. The method for exchanging information of claim 1 further comprising the step of prompting a user of the App to select from one or more available information request responses stored in the App Database before electronically transmitting the requested information to the Request App by the App.

6. The method for exchanging information of claim 1 wherein the information exchange request is sent via DTMF tones or SMS/Text Messaging.

7. The method for exchanging information of claim 1 wherein the requested information transferred to the Request App includes current location information for the portable electronic device.

8. The method for exchanging information of claim 1 wherein the second user is a 911 call center.

9. The method for exchanging information of claim 1 wherein the second user's electronic system or device is an electronic tablet.

10. The method for exchanging information of claim 1 further comprising the step of electronically triggering the second user's requestor electronic system or device to send the request for information exchange to the App by the second user's phone system when the telephone call is established in step b. between the second user's phone system and the portable electronic device.

11. The method for exchanging information of claim 1 further comprising the step of electronically forwarding any information received by the second user's requestor electronic system or device from the request in step c. to the second user's phone system.

12. The method for exchanging information of claim 1 wherein the portable electronic device is a hand held smart phone.

13. A method for exchanging information between a portable electronic device and a requestor's electronic system or device running an information exchange request application ("Request App") to allow the Request App to learn a current location of the portable electronic device running the App during a manually initiated call between the portable electronic device and the requestor's electronic system or device, said method comprising the steps of:

a1. running an Information Exchange System Application ("App") on a portable electronic device being worn or carried by a first person user;

a2. providing an Information Exchange System Application Database ("App Database") within the portable electronic device, the App in communication with the App Database;

a3. storing one or more contact and other information pertaining to the first person user in the App Database;

a4. manually entering a phone number for the requestor by the first person user using the portable electronic device for initiating a telephone call between the first person user to the requestor;

b1. establishing a telephone call connection between the portable electronic device and a phone system for the requestor;

b2. as part of establishing the telephone connection in step b1, providing a Caller ID information for the portable electronic device of the first person user to the phone system of the requestor;

b3. forwarding the Caller ID information by the phone system of the requestor to the Request App running on the requestor electronic system;

c. while the telephone call is ongoing between the portable electronic device and the second user's phone system initiating the Information Exchange App running on the portable electronic device by the Request App running on the requestor electronic system using the Caller ID information to permit a request for information exchange to be received by the App running on the portable electronic device of the first person user from the requestor electronic system or device of the second user sent by the Request App; wherein the requestor electronic system or device is a separate and independent system or device from the phone system and are both associated with the second user, wherein the request for information exchange is an independent and separate communication between the first person user and the second user;

d. electronically determining by the App whether the information exchange request received from the Request App was sent by a known and configured contact from the one or more contact information saved in the App Database;

e. determining or obtaining a current location or sensor data for the portable electronic device by the App;

f. determining by the App which information to transmit or send in response to the received request for information exchange based on the determined current location or obtained sensor data, wherein the information transmitted include the current location of the portable electronic device running the App;

g. when a known and configured contact is determined by the App in step d. based on information for the second user previously saved in the App Database or the contact is otherwise approved, electronically querying the portable electronic device's sensors, radios or internal data storage for the requested information; and h. while the telephone call is ongoing and without interrupting the telephone call electronically transmitting the requested information found by the App in step d. to the Requestor App by the App.

14. The method for exchanging information of claim 13 wherein configuration information stored in the App Database for a known contact includes a preferred and configured electronic method for automatically sending the requested information by the App to the Request App.

15. The method for exchanging information of claim 13 wherein configuration information stored in the App Database for a known contact includes requiring the App to receive explicit authorization by a user of the portable electronic device before the App electronically transmits the requested information to the Request App.

16. The method for exchanging information of claim 13 wherein when a contact is not known and configured in the App further comprising the step of prompting the user of the portable electronic device to provide explicit authorization to the App before the App is permitted to electronically transmit the requested information to the Request App.

17. The method for exchanging information of claim 13 further comprising the step of prompting a user of the App to select from one or more available information request responses stored in the App Database before electronically transmitting the requested information to the Request App by the App.

18. The method for exchanging information of claim 13 wherein the information exchange request is sent via DTMF tones or SMS/Text Messaging.

19. The method for exchanging information of claim 13 wherein the information exchange request is for location data including one or more of the following types of information: GPS coordinates, WiFi Location, Bluetooth/BLE Location, Object Recognition-based Location and Altitude of the portable electronic device running the App.

20. The method for exchanging information of claim 13 wherein the requestor is a 911 call center.

21. The method for exchanging information of claim 13 wherein the requestor's electronic system or device is an electronic tablet.

22. The method for exchanging information of claim 13 further comprising the step of electronically triggering the requestor's electronic system or device to send the request for information exchange to the App by the requestor's phone system when the telephone call is established in step b. between the requestor's phone system and the portable electronic device.

23. The method for exchanging information of claim 13 further comprising the step of electronically forwarding any information received by the requestor's electronic system or device from the request in step c. to the requestor's phone system.

24. The method for exchanging information of claim 13 wherein the portable electronic device is a hand held smart phone.

25. A method for exchanging information between a portable electronic device and a requestor electronic system or device running an information exchange request application ("Request App") through an Information Exchange Sync System ("Sync System") during a manually initiated call between the portable electronic device and the requestor's electronic system or device, said system comprising the steps of:

a1. running an Information Exchange System Application ("App") on a portable electronic device being worn or carried by a first person user;

a2. providing an Information Exchange System Application Database ("App Database") within the portable electronic device, the App in communication with the App Database;

a3. storing one or more contact and other information pertaining to the first person user in the App Database;

a4. manually entering a phone number for the requestor by the first person user using the portable electronic device for initiating a telephone call between the first person user to the requestor;

b1. establishing a telephone call connection between the portable electronic device and a phone system for the requestor; wherein the requestor's electronic system or device is a separate and independent system or device from the requestor's phone system and both the requestor's phone system and the requestor's electronic system or device are associated with the requestor;

b2. as part of establishing the telephone connection in step b1, providing a Caller ID information for the portable electronic device of the first person user to the phone system of the requestor;

b3. forwarding the Caller ID information by the phone system of the requestor to the Request App running on the requestor electronic system;

b4. Using the Caller ID information received from the phone system of the requestor, making an outbound call by the requestor electronic system to the portable electronic device of the first person user c. while the telephone call is ongoing between the portable electronic device and the requestor's phone system electronically determining by the App whether an outbound call is placed from the portable electronic device;

d. electronically determining by the App whether the outbound call is placed to a known and previously configured contact ("Contact") from the one or more contact information saved in the App Database;

e. electronically determining by the App when data is permitted to be transferred to the Contact based on information previously stored by the first person user using the App prior to step (a);

f. electronically querying the portable electronic device's sensors, radios or internal data storage for any information for a contact who was a recipient of the outbound call that was configured prior to step (a);

g. electronically transmitting information and an identifier for the portable electronic device identifier by the App to an Information Exchange Sync System "Sync System";

h while the telephone call is ongoing electronically querying the Sync System by the Request App for the information transmitted by the App in step g. based on the Request App receiving the outbound call from the portable electronic device and using an identifier received by the Request App for the portable electronic device who made the outbound call; and i. while the telephone call is ongoing and without interrupting the telephone call electronically transmitting the requested information associated with the identifier by the Sync System to the Request App.

26. The method for exchanging information of claim 25 wherein configuration information stored in an App Database of the portable electronic device for a known contact includes a preferred and configured electronic method for automatically sending the information by the App to the Sync System.

27. The method for exchanging information of claim 25 wherein the App is configured to require receipt of explicit authorization from a user of the portable electronic device before the App electronically transmits the information to the Sync System.

28. The method for exchanging information of claim 25 wherein the App, Sync System and Request App all utilize the phone number assigned to the user's device as the identifier for matching and transmitting information originating from the App and ultimately received by the Request App.

29. The method for exchanging information of claim 25 further comprising the step of using a current location or sensor data of the portable electronic device by the App for the App to determine which information to transmit or send to the Sync System.

30. The method for exchanging information of claim 25 wherein the requested information transferred to the Request App includes current location information for the portable electronic device.

31. The method for exchanging information of claim 25 wherein the requestor is a 911 call center.

32. The method for exchanging information of claim 25 wherein the requestor's electronic system or device is an electronic tablet.

33. The method for exchanging information of claim 25 wherein the portable electronic device is a hand held smart phone.

* * * * *